US012743584B2

(12) United States Patent
Liu et al.

(10) Patent No.: US 12,743,584 B2
(45) Date of Patent: Sep. 22, 2026

(54) METHOD AND DEVICE FOR OBTAINING GRAPH, METHOD AND DEVICE FOR TRAINING OBJECT GROUP EXTRACTION MODEL, AND STORAGE MEDIUM

(71) Applicant: BEIJING BAIDU NETCOM SCIENCE TECHNOLOGY CO., LTD., Beijing (CN)

(72) Inventors: Yuan Liu, Beijing (CN); Shenglong Jin, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 134 days.

(21) Appl. No.: 18/745,791

(22) Filed: Jun. 17, 2024

(65) Prior Publication Data

US 2025/0005284 A1 Jan. 2, 2025

(30) Foreign Application Priority Data

Mar. 20, 2024 (CN) ........................ 202410324497.6

(51) Int. Cl.
*G06F 40/30* (2020.01)
*G06F 40/284* (2020.01)
*G06N 20/00* (2019.01)

(52) U.S. Cl.
CPC ........... *G06F 40/284* (2020.01); *G06N 20/00* (2019.01)

(58) Field of Classification Search
None
See application file for complete search history.

(56) References Cited

U.S. PATENT DOCUMENTS 11,847,565 B1 * 12/2023 Hao ........................ G06N 3/045
12,041,024 B1 * 7/2024 Dong .................. H04L 12/1822
2017/0329844 A1 * 11/2017 Tacchi ................ G06F 16/9024
(Continued)

FOREIGN PATENT DOCUMENTS

CN 107368468 A 11/2017
CN 110489751 A 11/2019
(Continued)

OTHER PUBLICATIONS

Office Action issued in Chinese patent application No. 2024103244976, dated Jul. 16, 2026 (16 pages).
(Continued)

*Primary Examiner* — Jakieda R Jackson
(74) *Attorney, Agent, or Firm* — Osha Bergman Watanabe & Burton LLP

(57) ABSTRACT

The present disclose provides a method, an apparatus for obtaining a graph, a device, and a medium, and relates to a field of artificial intelligence such as natural language processing, computer vision, and the like. The method includes: obtaining a predetermined reference relationship graph; obtaining an update object text and extracting a first update object group in the update object text; recognizing whether the first update object group satisfies a graph update condition of the reference relationship graph; and obtaining an updated target relationship graph by updating the reference relationship graph based on the first update object group in response to recognizing the first update object group satisfies the graph update condition.

18 Claims, 5 Drawing Sheets

(56) References Cited

U.S. PATENT DOCUMENTS

| | | | | |
|---|---|---|---|---|
| 2021/0133390 | A1* | 5/2021 | Tagawa | G06T 11/206 |
| 2021/0294970 | A1* | 9/2021 | Bender | G06N 5/022 |
| 2021/0295822 | A1* | 9/2021 | Tomkins | G10L 15/197 |
| 2021/0303601 | A1* | 9/2021 | Yoshitake | G06F 16/367 |
| 2023/0153526 | A1* | 5/2023 | Wang | G06N 3/084 |
| | | | | 704/9 |
| 2023/0401238 | A1* | 12/2023 | Khan | G06F 16/245 |
| 2023/0419574 | A1* | 12/2023 | Yamada | G06T 11/60 |
| 2024/0193440 | A1* | 6/2024 | Shrivastava | G06N 5/025 |
| 2024/0232539 | A1* | 7/2024 | Venkateshwaran | G06N 3/044 |
| 2025/0095393 | A1* | 3/2025 | Yang | G06F 40/205 |

FOREIGN PATENT DOCUMENTS

| | | | |
|---|---|---|---|
| CN | 110543574 | A | 12/2019 |
| CN | 110781317 | A | 2/2020 |
| CN | 112434167 | A | 3/2021 |
| CN | 113239210 | A | 8/2021 |
| CN | 113254675 | A | 8/2021 |
| CN | 114020936 | A | 2/2022 |
| CN | 114840685 | A | 8/2022 |
| CN | 115033706 | A | 9/2022 |
| CN | 115809340 | A | 3/2023 |
| CN | 117093726 | A | 11/2023 |
| CN | 117332282 | A | 1/2024 |
| WO | 2021114834 | A1 | 6/2021 |

OTHER PUBLICATIONS

Ma Weilu, et al., "Comparative Study and Optimization Strategies of Knowledge Graph Construction Management Systems", 2023 (13 pages).

* cited by examiner

METHOD AND DEVICE FOR OBTAINING GRAPH, METHOD AND DEVICE FOR TRAINING OBJECT GROUP EXTRACTION MODEL, AND STORAGE MEDIUM

CROSS-REFERENCE TO RELATED APPLICATION

The present application is based upon and claims priority to Chinese Patent Application No. 2024103244976, filed on Mar. 20, 2024, the entirety contents of which are incorporated herein by reference.

TECHNICAL FIELD

The present disclosure relates to a field of data processing, in particular to a field of artificial intelligence such as natural language processing and computer vision, and specifically relates a method for a method and a device for obtaining a graph, a method and a device for training object group extraction model, and a storage medium.

BACKGROUND

With the development of society, main information can be extracted from risk information that has occurred, so as to obtain abstract information in the risk information, and obtain an association between the abstract information and the abstract information.

In related art, the associated abstract information may be extracted from the textual content of the risk information based on a predetermined range of prompts. However, since the extraction of the abstract information depends to a certain extent on the range of prompts, when there is a prompt other than the predetermined range of prompts in the textual content of the risk information, abstract information corresponding to this prompt may not be extracted, resulting in incomplete extraction of the abstract information in the risk information.

SUMMARY

According to a first aspect of the present disclosure, there is provided a method for obtaining a graph. The method includes: obtaining a predetermined reference relationship graph; obtaining an update object text and extracting a first update object group in the update object text; recognizing whether the first update object group satisfies a graph update condition of the reference relationship graph; and obtaining an updated target relationship graph by updating the reference relationship graph based on the first update object group in response to recognizing the first update object group satisfies the graph update condition.

According to a second aspect of the present disclosure, there is provided a method for training an object group extraction model. The method includes: obtaining a candidate object group extraction model to be trained and a sample object text; obtaining a predetermined reference object set to extract a sample object group from the sample object text; obtaining a trained target object group extraction model by performing model training on the candidate object group extraction model based on the sample object text and the sample object group until the end of the training, in which the target object group extraction model is configured to implement the method for obtaining a graph according to the first aspect.

According to a third aspect of the present disclosure, there is provided a device for obtaining a graph. The device includes: at least one processor; and a memory communicatively coupled to the at least one processor and storing instructions executable by the at least one processor. The at least one processor is configured to:

obtain a predetermined reference relationship graph; obtain an update object text and extract a first update object group in the update object text; recognize whether the first update object group satisfies a graph update condition of the reference relationship graph; and obtain an updated target relationship graph by updating the reference relationship graph based on the first update object group in response to recognizing the first update object group satisfies the graph update condition.

According to a fourth aspect of the present disclosure, there is provided a device for training an object extraction model. The device includes: at least one processor; and a memory communicatively coupled to the at least one processor and storing instructions executable by the at least one processor. The at least one processor is configured to perform the method for training an object group extraction model according to the second aspect.

According to a fifth aspect of the present disclosure, there is provided a non-transitory computer-readable storage medium. The storage medium stores computer instructions. The computer instructions are configured to cause a computer to perform the method for obtaining a graph according to the first aspect or the method for training an object group extraction model according to the second aspect.

It should be appreciated that the description in this section is not intended to identify key or important features of embodiments of the present disclosure, nor is it intended to limit the scope of the present disclosure. Other features of the present disclosure will be readily understood by the following specification.

BRIEF DESCRIPTION OF THE DRAWINGS

The accompanying drawings are used for better understanding of the present embodiment and do not constitute a limitation of the present disclosure.

DETAILED DESCRIPTION

Figures 1, 2:
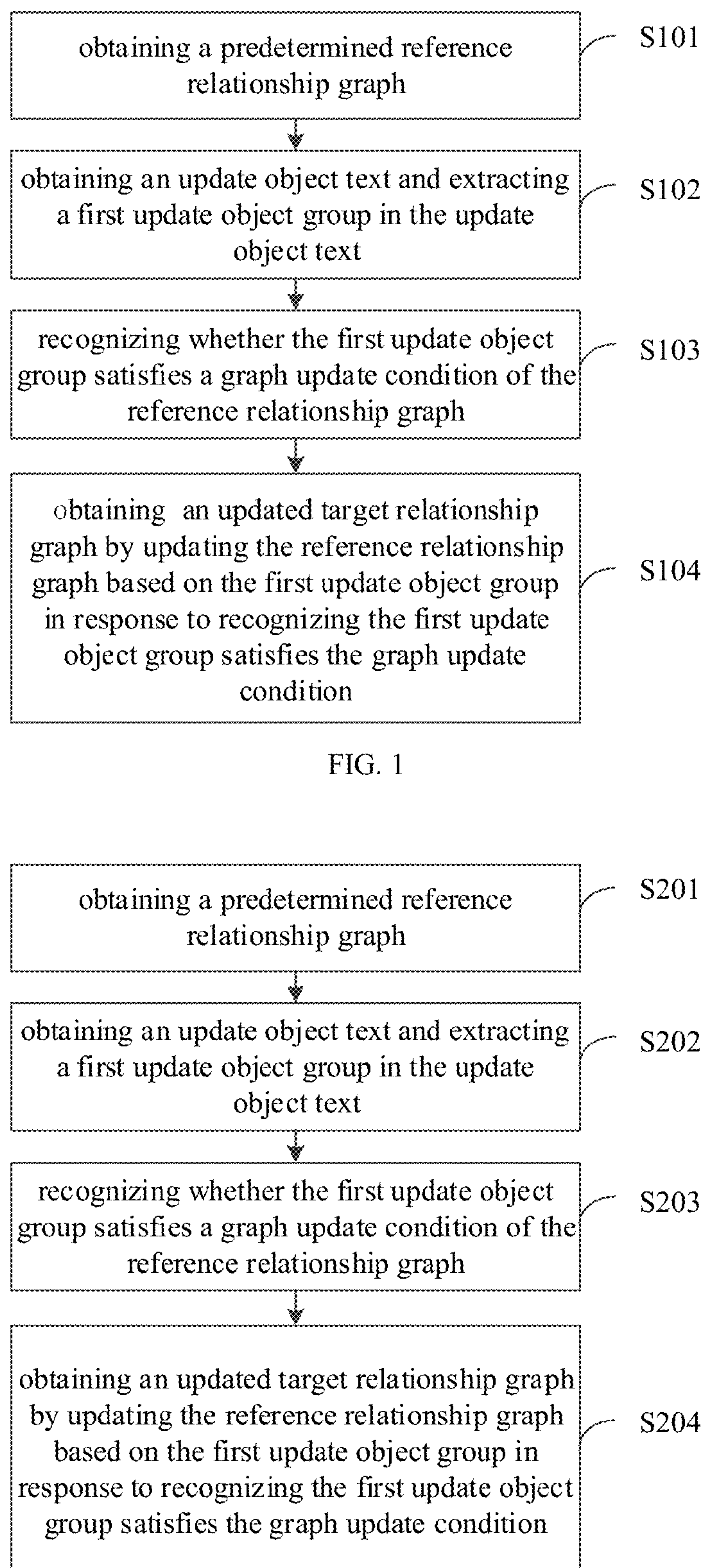
FIG. 1 is a flowchart illustrating a method for obtaining a graph according to an embodiment of the present disclosure.
FIG. 2 is a flowchart illustrating a method for obtaining a graph according to an embodiment of the present disclosure.

Exemplary embodiments of the present disclosure are described hereinafter in conjunction with the accompanying drawings, which include various details of the embodiments of the present disclosure in order to aid in understanding, and which should be considered exemplary only. Accordingly, a person skilled in the art should recognize that various changes and modifications can be made to the embodiments described herein without departing from the scope and spirit of the present disclosure. Similarly, descriptions of well-known features and structures are omitted from the following description for the sake of clarity and brevity.

Data processing is a fundamental step of systems engineering and automatic control. Data is a form of expression of facts, concepts, or instructions that may be processed either manually or by automated devices. Data becomes information when it is interpreted and given a certain meaning. The data processing is capturing, storage, retrieval, processing, transformation and transmission of data, and a basic purpose of the data processing is to extract and derive, from a large amount of data that may be disorganized and difficult to comprehend, data that is valuable and meaningful.

Natural language processing (NLP) is an important direction in the field of computer science and artificial intelligence. It studies various theories and methods that enable effective communication between humans and computers in natural language. The natural language processing is a scientific natural language processing that integrates linguistics, computer science and mathematics, and is mainly used in machine translation, public opinion monitoring, automatic summarization, viewpoint extraction, text categorization, question answering, text semantic comparison, speech recognition, and optical character recognition (OCR) for Chinese.

Computer vision (CV) refers to a use of a camera and a computer instead of the human eye to perform machine vision on a target, such as identification, tracking and measuring, and further to perform graphic processing by using a variety of imaging systems instead of visual organs as an input-sensitive means and using a computer instead of the brain to complete the processing and interpretation, so as to generate a graphic that is more suitable to be observed for the human eye or transmit to an instrument for detection. The computer vision studies related theories and techniques, and attempts to build artificial intelligence systems capable of acquiring “information” from images or multidimensional data. Since perception can be regarded as extracting information from sensory signals, the computer vision can also be regarded as a science of how to make artificial systems “perceive” from images or multidimensional data.

Artificial intelligence (AI) is a new technological science that researches and develops theories, methods, technologies, and application systems for simulating, extending, and expanding human intelligence. Artificial Intelligence is a branch of computer science that attempts to understand the essence of intelligence and produce a new intelligent machine capable of responding in a manner similar to human intelligence. The research in this field includes robotics, language recognition, image recognition, natural language processing, and expert systems. Since the emergence of the artificial intelligence, the theories and technologies have become increasingly mature, and the field of application is also expanding. It can be envisioned that scientific and technological products brought by the artificial intelligence in the future will be the “containers” of human intelligence. The artificial intelligence can simulate the information process of human consciousness and thinking.

FIG. 1 is a flowchart illustrating a method for obtaining a graph according to an embodiment of the present disclosure, as shown in FIG. 1, the method includes the following steps S101 to S104.

At S101, a predetermined reference relationship graph is obtained.

In an embodiment of the present disclosure, abstract information may be extracted from open source information, and the extracted abstract information is analyzed to provide corresponding information support for subsequent operations.

The open source information may be information such as news that has been published, or other types of open source information, which is not specifically limited herein.

As an example, setting the open source information to be publicly available information of in the financial field, setting that first abstract information and second abstract information are extracted from the publicly available information, in which an occurrence of the first abstract information leads to an occurrence of the second abstract information, then in the embodiment, the first abstract information may be labeled as a cause object, and the second abstract information may be labeled as an effect object for the cause object.

The first abstract information may be major shareholder restructuring, and the second abstract information may be a change in the actual controller of the company, then in this example, it may be determined that a potential opportunity for mergers and acquisitions emerges due to the occurrence of the cause object and the effect object, and in the scenario, this analysis result can provide information support for subsequent associated operations.

In an embodiment of the present disclosure, extraction of an object group formed by the cause object and the corresponding effect object may be performed on a published object text, and there is a certain degree of association relationship between the object groups extracted from the published object text.

As an example, when the association relationship is a causal relationship, the plurality of object groups may be in a relationship of one cause-multiple effects, or a relationship of multiple cause-one effect scenarios.

Based on the example, setting a target object group extraction model extracts an object group 1 and an object group 2 from the published object text, in which the object group 1 includes a cause object 1 and an effect object 1, the object group 2 includes a cause object 2 and an effect object 2, and the effect object 1 is set to be a cause object for the cause object 2.

Then, in the example, the occurrence of the cause object 1 leads to the occurrence of the effect object 1, the occurrence of the effect object 1 leads to the occurrence of the cause object 2, and the occurrence of the cause object 2 leads to the occurrence of the effect object 2, and in this scenario, the object group 1 and the object group 2 is in a relationship of multi-causes and one-effect, i.e., the cause object 1→the effect object 1→the cause object 2→the effect object 2.

In an embodiment of the present disclosure, a corresponding association relationship graph may be constructed based on the association relationship between the plurality of object groups to realize an intuitive presentation of the association relationship between the plurality of object groups.

Alternatively, for any field, events routinely occurring in the field may be labeled as common abstract information, and the association relationships between the common abstract information may be analyzed, and the abstract information with association relationship may be combined to obtain a common object group in the field.

In this scenario, algorithm processing may be performed on a plurality of common object groups within the field based on the graph construction algorithm in related art and based on the association relationship between the plurality of common object groups, to obtain an association relationship graph of the plurality of common object groups, and labeling the graph as a reference relationship graph within the field.

It is noted that the association relationship between the plurality of events may be intuitively acquired based on the reference relationship graph, and it may be appreciated that in a scenario that the association relationship is a causal relationship, for a one cause-multiple effects scenario and for a multiple causes-one effect scenario, the association relationship between the plurality of abstract information may be intuitively acquired from the reference relationship graph.

At S102, an update object text is obtained and a first update object group in the update object text is extracted.

In an embodiment of the present disclosure, the object group may be extracted from a new published object text through a predetermined object extraction method, and the extracted object group may be merged into the reference relationship graph based on an association relationship between the extracted object group and an existing reference object group in the reference relationship graph.

The new published object text may be labeled as the update object text.

Alternatively, algorithm processing of semantic recognition analysis may be performed on the update object text based on a semantic recognition algorithm in the related art, and then a cause object and a corresponding effect object in the update object text may be extracted based on the algorithm processing result, thus obtaining the object group in the update object text.

The object group extracted from the update object text may be labeled as the first update object group.

At S103, it is recognized whether the first update object group satisfies a graph update condition of the reference relationship graph.

In an embodiment of the present disclosure, there is a graph updating condition predetermined for the reference relationship graph, and for any object group, if the object group satisfies the graph updating condition, the object group may be updated to the reference relationship graph.

Alternatively, the graph update condition may be whether an association relationship exists between the object group and a reference object existing in the reference relationship graph. In this scenario, if an association relationship exists between the first update object group and the reference object existing in the reference relationship graph is recognized, the first update object group may be determined to satisfy the graph update condition of the reference relationship graph.

Alternatively, the graph update condition may also be a determination condition corresponding to the association relationship between the reference object existing in the reference relationship graph. When the association relationship between the first update object group is recognized to satisfy the determination condition, the first update object group may be determined to satisfy the graph update condition.

At S104, in response to recognizing the first update object group satisfies the graph update condition, an updated target relationship graph is obtained by updating the reference relationship graph based on the first update object group.

In an embodiment of the present disclosure, when the first update object group is recognized to satisfy the graph update condition of the reference relationship graph, the first update object group may be merged into the reference relationship graph to update the reference relationship graph, and the updated graph may be labeled as the target relationship graph.

Alternatively, algorithm processing may be performed on the first update object group based on the graph construction algorithm in the related art, to obtain an association relationship graph of the first update object group based on the algorithm processing result, and the association relationship graph may be merged into the reference relationship graph in order to realize the updating of the reference relationship graph, and obtaining the updated target relationship graph.

Alternatively, a reference object in the reference relationship graph that has an association relationship with the first update object group may be obtained, and a graph node update corresponding to the first update object group may be performed on a graph node to which the reference object belongs, thus merging the first update object group into the reference relationship graph to obtain the updated target relationship graph.

The method for obtaining a graph provided in the present disclosure includes: obtaining a predetermined reference relationship graph; obtaining an update object text and extracting a first update object group in the update object text; recognizing whether the first update object group satisfies a graph update condition of the reference relationship graph; obtaining an updated target relationship graph by updating the reference relationship graph based on the first update object group in response to recognizing the first update object group satisfies the graph update condition. In the present disclosure, the first update object group in the update object text is extracted, and in response to recognizing the first update object group satisfies the graph update condition, the updated target relationship graph is obtained by updating the reference relationship graph based on the first update object group, which improves the timeliness of updating the reference relationship graph and reduces the possibility that the object groups in the published object text cannot be completely extracted due to the limitation of the scope of the reference objects corresponding to the reference relationship graph. The method improves the visualization of the display of the association relationship by displaying the association relationship through the target relationship graph, reduces the complexity of obtaining the association relationship and improves the efficiency and accuracy of obtaining the association relationship in the scenario that the association relationship is one cause-multiple effect and/or multiple cause-one effect relationship of the causal relationships. In the scenario that the extracted object group is analyzed based on the association relationship, the method improves the efficiency and accuracy of the analysis of the object group, reduces the complexity of the pre-analysis narrative preparation, improves the efficiency of the information obtaining, and thus improves the accuracy and timeliness of the execution of the relevant downstream tasks.

In the above embodiments, the obtaining of the target relationship graph may be further understood in combination with FIG. 2, which is a flowchart illustrating a method for obtaining a graph according to an embodiment of the present disclosure. As shown in FIG. 2, the method includes the following steps S201 to S204.

At S201, a predetermined reference relationship graph is obtained.

Alternatively, a predetermined reference object set and a reference object description of each reference object are obtained.

In an embodiment of the present disclosure, for any field, an event routinely occurring in the field may be labeled as a reference object, thus obtaining a reference object set that is formed by a plurality of reference objects.

Alternatively, there is descriptive information for respective reference objects in the reference object set, and the descriptive information of the reference object may be labeled as reference object description of the reference object.

Alternatively, reference association relationships between respective reference objects are obtained.

In an embodiment of the present disclosure, an association relationship may exist between respective reference objects in the reference object set. For example, for the reference object 1 and the reference object 2, the occurrence of the reference object 1 may cause the occurrence of the reference object 2, then in the example, it is determined that there is an association relationship between the reference object 1 and the reference object 2, in which the association relationship may be a causal relationship, and the reference object 1 is the cause for the reference object 2, and the reference object 2 is the effect for the reference object 1.

In this scenario, the association relationship that exists between respective reference objects may be labeled as the reference association relationship.

Alternatively, the reference object description of each reference object and the reference association relationships between respective reference objects are inputted into a graph database Bgraph, and the reference relationship graph of the reference object set is obtained through a graph construction capability of the graph database BGraph.

In an embodiment of the present disclosure, through a graph construction algorithm in the related art, algorithm processing may be performed on the reference object set, the reference object description of respective reference objects, and the reference association relationships between respective reference objects, and then the reference relationship graph of the reference object set may be obtained based on the result of the algorithm processing.

Alternatively, the reference relationship graph of the reference object set may be constructed through the graph construction capability of the graph database BGraph. The reference object description of respective reference objects and the reference association relationships between the respective reference objects are input into the graph database Bgraph, and the graph database Bgraph performs graph construction processing on the reference object description of the respective reference objects and the reference association relationships between the respective reference objects, to obtain the reference relationship graph of the reference object set.

Figure 3:
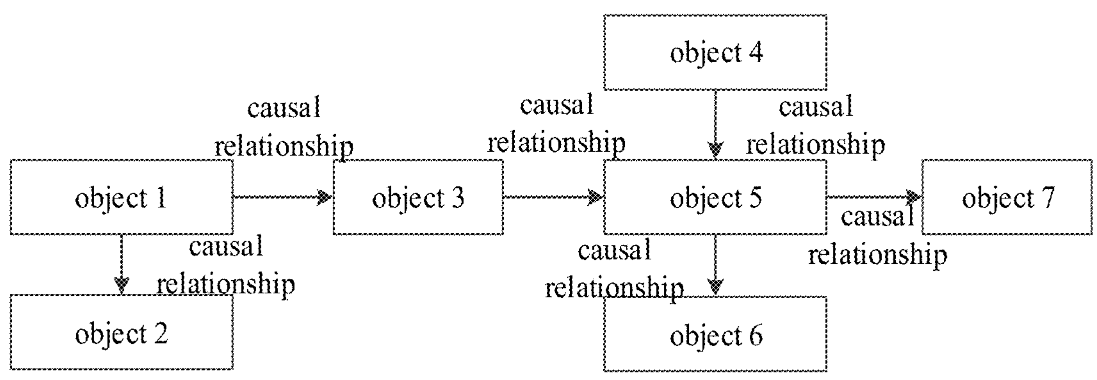
FIG. 3 is a flowchart illustrating a method for obtaining a graph according to an embodiment of the present disclosure.

As an implementation, as shown in FIG. 3, the reference object set is set to include object 1, object 2, object 3, object 4, object 5, object 6, and object 7 illustrated in FIG. 3. The occurrence of object 1 leads to the occurrence of object 2 and object 3, the occurrence of object 3 and object 4 leads to the occurrence of object 5, the occurrence of object 5 leads to the occurrence of object 6 and object 7. Therefore, from FIG. 3, a causal association relationship exists between object 1 and object 2, a causal association relationship exists between object 1 and object 3, a causal association relationship exists between object 3 and object 5, a causal association relationship exists between object 4 and object 5, a causal association relationship exists between object 5 and object 6, and a causal association relationship exists between object 5 and object 7.

In the example, the association relationship between the object 1, the object 2, the object 3, the object 4, the object 5, the object 6, and the object 7, and the respective object descriptions of the object 1, the object 2, the object 3, the object 4, the object 5, the object 6, and the object 7 may be inputted into a graph database Bgraph, the reference relationship graph illustrated in FIG. 3 is constructed through the graph construction capability of the graph database Bgraph.

It is noted that, as an example, in a scenario where a reference object set is the reference object set corresponding to a financial field, object 1 illustrated in FIG. 3 may be an object related to policy regulation information, object 2 may be an information object related to price fluctuation abnormality information, object 3 may be an object related to order increase information, object 4 may be an information object related to sales volume increase information, object 5 may be an information object related to information on year-on-year increase in revenue, object 6 may be an information object related to information on year-on-year increase in profit, and object 7 may be an information object related to performance increase information, or other information object having the correlation relationship illustrated in FIG. 3, which is not specifically limited herein.

At S202, an update object text is obtained and a first update object group in the update object text is extracted.

Alternatively, an update token string sequence of the update object text is extracted and an update feature vector of each update token string in the update token string sequence is obtained.

In an embodiment of the present disclosure, the update object text may be information carried by text, and in this scenario, algorithm processing may be performed on the update object text based on a text semantic string extraction algorithm in the related art, to extract the token string in the update object text, which is labeled as an update token string, and thus obtaining the update token string sequence formed by a plurality of update token strings in the update object text.

Further, a token string feature vector extraction algorithm in the related art is obtained, and algorithm processing based on this algorithm is performed on each update token string, to obtain a feature vector of each update token string, which is labeled as an update feature vector of each update token string.

Alternatively, an update cause object is extracted based on the update feature vector of each update token string.

In an embodiment of the present disclosure, a cause object in the update object text may be extracted from each update token string based on the update feature vector of each update token string, which is labeled as the update cause object in the update object text.

An update cause object start token string and an update cause object terminated token string are recognized based on the update feature vector of each update token string; and the update cause object is obtained, by obtaining an update cause object token string in the update token string sequence based on the update cause object start token string and the update cause object terminated token string.

In an embodiment of the present disclosure, an extraction position of the cause object to be extracted in the update object text may be determined by determining the start token and the terminated token of the update cause object in the update object text, and thus obtaining the update cause object token string formed by the token string at the extraction position.

It is appreciated that, for the cause object in the update object text that needs to be extracted, the start token string and the terminated token string of the cause object in the update object text may be recognized based on the update feature vector of each update token string, and are labeled as the update cause object start token string and the update cause object terminated token string, and the update cause object start token string, the update cause object terminated token string, and a total token string formed by strings between the two are determined as the update cause object token strings in the update token string sequence.

Further, the event formed by the token corresponding to the update cause object token string is determined as the update cause object in the update object text.

Alternatively, an update effect object is extracted based on the update feature vector of each update token string.

In an embodiment of the present disclosure, an effect object in the update object text that has a association relationship with the extracted cause object may be extracted from each update token string based on the update feature vector of each update token string, and is labeled as the update effect object for the update cause object in the update object text.

For the update effect object corresponding to the update cause object to be extracted in the update object text, an update effect object start token string and an update effect object terminated token string may be recognized based on the update feature vector of each update token string; the update effect object is obtained, by obtaining the update effect object token string in the update token string sequence based on the update effect object start token string and the update effect object terminated token string.

In an embodiment of the present disclosure, an extraction position of the effect object to be extracted in the update object text may be determined by determining the start token and the terminated token of the update effect object in the update object text, to obtain the update effect object token string formed by the token string at the extraction position.

It is appreciated that, for the effect object to be extracted in the update object text, the start token string and the terminated token string of the effect object in the update object text may be recognized based on the update feature vector of each update token string, and labeled as the update effect object start token string and the update effect object terminated token string, and the update effect object start token string, the update effect object terminated token string, and a total token string formed by strings between the two are determined as the update effect object token string in the update token string sequence.

Further, an event formed by the token corresponding to the update effect object token string is determined as the update effect object in the update object text.

Alternatively, the first update object group of the update object text is obtained based on the update cause object and the update effect object.

In an embodiment of the present disclosure, the update cause object and the corresponding update effect object extracted from the update object text may be grouped, and the grouped objects may be labeled as the first update object group in the update object text.

As an example, the update cause object extracted from the update object text is set to be an order increase information object, and the update effect object for the update cause object in the update object text is quantity of reaching intention year-over-year increase information object, and thus the first update object group formed by "the order increase information object→the quantity of reaching intention year-over-year increase information object" may be obtained by combining the order increase information object and the quantity of reaching intention year-over-year increase information object.

At S203, it is recognized whether the first update object group satisfies a graph update condition of the reference relationship graph.

Alternatively, the reference association relationships between respective reference objects are obtained from the reference relationship graph.

In an embodiment of the present disclosure, for any reference object, a reference object that has an association relationship with the reference object may be obtained from the reference association relationships between respective reference objects displayed in the reference relationship graph.

As an implementation, as shown in FIG. 3, the association relationship between object 1, object 2, object 3, object 4, object 5, object 6, and object 7 illustrated in FIG. 3 may be obtained intuitively from the graph illustrated in FIG. 3. In a scenario that the graph illustrated in FIG. 3 is the reference relationship graph, as illustrated in FIG. 3, the reference association relationship between the object 1, the object 2, the object 3, the object 4, the object 5, the object 6, and the object 7 may be obtained intuitively.

Alternatively, an update association relationship of the first update object group is obtained.

In an embodiment of the present disclosure, there is an association relationship between the update cause object and the update effect object in the first update object group, and the association relationship between the two may be labeled as an update association relationship of the first update object group.

Alternatively, for any reference association relationship, a relationship similarity between the reference association relationship and the update association relationship is obtained.

In an embodiment of the present disclosure, the update association information of the first update object group may be compared in similarity with the reference association relationship between the reference objects already existed in the reference relationship graph, and whether or not the first update object group satisfies the graph update condition of the reference relationship graph may be recognized based on the result of the similarity comparison.

The association relationship between the reference objects already existed in the reference relationship graph may be labeled as the reference association relationship.

In the scenario, for any reference association relationship, a similarity between the update association relationship and the reference association relationship may be calculated according to a similarity algorithm in the related art, and thus a similarity between the update association relationship and the reference association relationship may be obtained based on the result of the algorithm processing, and is labeled as the relationship similarity.

Alternatively, whether the first update object group satisfies the graph update condition is recognized based on the relationship similarity.

In response to the relationship similarity between any reference association relationship and the update association relationship being greater than or equal to a predetermined relationship similarity threshold, it is determined that the recognized first update object group satisfies the graph update condition.

In an embodiment of the present disclosure, a relationship similarity between each of all the reference association relationships in the reference relationship graph with the update association relationship may be obtained, and when there is a relationship similarity between any reference association relationship and the update association relationship being greater than or equal to the predetermined relationship similarity threshold, the first update object group and the reference objects existed in the reference relationship graph may be determined to be the same type of event.

In the scenario, it may be determined that the first update object group satisfies the graph update condition of the reference relationship graph.

Accordingly, in response to a relationship similarity between any reference association relationship in the reference relationship graph and the update association relationship being less than the predetermined relationship similarity threshold, it is determined that the first update object group does not satisfy the graph update condition.

In an embodiment of the present disclosure, a relationship similarity between each of all reference association relationships in the reference relationship graph with the update association relationship may be obtained, when all of the obtained relationship similarities are less than the predetermined relationship similarity threshold, the first update object group and the reference objects existed in the reference relationship graph may be determined to be the different type of events.

In the scenario, it may be determined that the first update object group does not satisfy the graph update condition of the reference relationship graph.

It is noted that, in an embodiment of the present disclosure, for the first update object group that does not satisfy the graph updating condition, the first update object group may be further processed based on a predetermined method to be added into a range of reference objects already existed in the reference relationship graph, which may be understood in conjunction with the following:

Alternatively, in response to recognizing that the first update object group does not satisfy the graph update condition, the first update object group is added to a second update object group set and the second update object group set is clustered, to obtain an object class cluster of the second update object group set.

In an embodiment of the present disclosure, when recognizing that the first update object group does not satisfy the graph update condition, the first update object group may be labeled as a second update object group, and is added to the second update object group set.

It is appreciated that the second update object group is the update object group that does not satisfy the graph update condition, and the second update object group set includes the update object groups that do not satisfy the graph update condition of the reference relationship graph within a set time range.

In the scenario, each second update object group may be clustered by a clustering algorithm in the related art based on a predetermined time interval, and a class cluster obtained after clustering may be labeled as an object class cluster of the second update object group set.

Alternatively, an object class cluster label of the object class cluster may be obtained, and in response to the object class cluster label satisfying a predetermined addition condition of the reference object set, the object class cluster label is added as a new reference object to the reference object set.

In an embodiment of the present disclosure, label information of the object class clusters of the second update object group set may be obtained, and the obtained label information may be determined to be the object class cluster label of the object class cluster.

As an example, the second update object group may be set to be clustered based on a time interval of ten natural days to obtain five object class clusters after clustering, and further, label information of the five object class clusters may be determined based on a predetermined label obtaining algorithm, to obtain the object class cluster label of each of the five object class clusters.

Alternatively, after obtaining the object class cluster label of the object class cluster, event description information in the object class cluster label may be compared with the predetermined addition condition corresponding to the reference object set existed in the reference relationship graph, and the object class cluster label is recognized to satisfy the predetermined addition condition based on the comparison result, so as to determine whether the object class cluster label may be added to the reference object set as a new reference object.

The predetermined addition condition of the reference object set may include whether the object information in the object class cluster label is common information of the corresponding field, and may also include a degree of influence of the object information in the object class cluster label in the corresponding field, which is not specifically limited herein.

Alternatively, a new reference relationship graph is obtained by performing a node update of the reference relationship graph based on the new reference object.

In an embodiment of the present disclosure, when the object class cluster label is recognized to satisfy the predetermined conditions, a new reference object may be generated based on the object class cluster label, and the new reference object may be added to the reference object set existing in the reference relationship graph.

In the scenario, when the reference object set is updated, the corresponding reference relationship graph needs to be updated accordingly. A reference object description of the new reference object, and an association relationship between the new reference object and each reference object in the existing reference object set may be obtained, and the information is input into the graph database Bgraph. Through the graph construction capability of the graph database Bgraph, a graph node corresponding to the new reference object is constructed on the basis of the original reference relationship graph, thus completing the node updating of the reference relationship graph and obtaining the updated reference relationship graph.

At S204, in response to recognizing the first update object group satisfies the graph update condition, an updated target relationship graph is obtained by updating the reference relationship graph based on the first update object group.

In an embodiment of the present disclosure, when recognizing the first update object group satisfies the graph update condition, the reference relationship graph may be updated based on the first update object group according to the predetermined graph update strategy, and the updated reference relationship graph may be labeled as a target relationship graph.

In response to recognizing that the first update object group satisfies the graph update condition, an associated object group for the first update object group in the reference relationship graph is obtained.

In an embodiment of the present disclosure, a reference object group, with a relationship similarity between a reference association relationship of the reference object group and the update association relationship of the first update object group greater than or equal to the similarity threshold, may be obtained from reference association relationships of the reference relationship graph, and the reference object group may be determined as an associated object group for the first update object group in the reference relationship graph.

Alternatively, an associated object relationship of the associated object group is obtained, and the first update object group is merged the associated object group based on the update association relationship and the associated object relationship, so as to update the reference relationship graph to obtain the target relationship graph.

In an embodiment of the present disclosure, the association relationship between the associated object groups may be labeled as an associated object relationship, and in the scenario, relationships in the update association relationship and the associated object relationship may be analyzed to obtain an association relationship between objects included in the first update object group and the associated object group.

As an example, the first update object group is set to include a cause object 1 and an effect object 1, and the associated object group is set to include a cause object 2 and an effect object 2, in which the effect object 1 is a cause object for the cause object 2.

Then, in the example, it is known based on the update association relationship of the first update object group and the associated object relationship of the associated object group that the association relationship between the cause object 1, the effect object 1, the cause object 2, and the effect object 2 is "cause object 1→effect object 1→cause object 2→effect object 2".

Further, the objects in the first update object group is associated and merged with the objects in the associated object group based on the association relationship, thus an update of the reference relationship graph is realized, and the updated target relationship graph is then obtained.

Based on the above embodiment, a new graph node may be added upstream of the cause object 2 in the associated object group as a graph node of the effect object 1 and connected to the graph node of the cause object 2, and a new graph node may be added upstream of the graph node of the effect object 1 as a graph node of the cause object 1 and connected to the graph node of the effect object 1, thus, the merging and updating of "cause object 1→effect object 1" and "cause object 2→effect object 2" is realized, and the updated target relationship graph is obtained.

Figure 4:
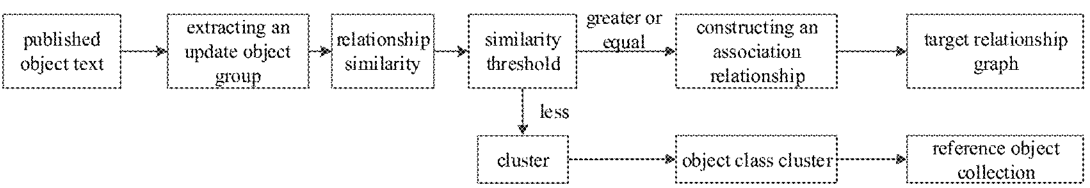
FIG. 4 is a flowchart illustrating a method for obtaining a graph according to an embodiment of the present disclosure.

As another implementation, as shown in FIG. 4, a published object text of a field illustrated in FIG. 4 may be obtained, and an object group in the published object text may be extracted to obtain an update object group illustrated in FIG. 4.

Further, a relationship similarity between an update association relationship of the update object group illustrated in FIG. 4 and the reference association relationship existed in the reference relationship graph is obtained and compared to a predetermined similarity threshold.

As shown in FIG. 4, a relationship similarity between each of all the reference association relationships of the reference relationship graph with the update association relationship of the update object group is obtained, and when any of the relationship similarities is greater than or equal to the similarity threshold, it may be determined that the update object group illustrated in FIG. 4 satisfies the predetermined graph update condition.

In the scenario, an associated object group of the update object group in the reference relationship graph may be obtained, and an association relationship between the update object group and each object in the associated object group may be constructed, and the update object group may be merged into the reference relationship graph based on the association relationship to realize updating of the reference relationship graph, and thus obtaining the updated target relationship graph.

As shown in FIG. 4, a relationship similarity between each of all the reference association relationships of the reference relationship graph with the update association relationship of the update object group is obtained, and when all the relationship similarities are less than the predetermined similarity threshold, it may be determined that the update object group illustrated in FIG. 4 does not satisfy the predetermined graph update condition.

In the scenario, the update object group that does not satisfy the graph update condition may be clustered to obtain an object class cluster, and each object class cluster may be labeled to obtain an object class cluster label for each object class cluster.

Alternatively, it may be determined whether the object class cluster label satisfies a predetermined addition condition of the reference object set in the reference relationship graph, and when determining that the object class cluster label satisfies the predetermined addition condition, the object class cluster label may be added to the reference object set as a new reference object.

According to the method for obtaining a graph provided in the present disclosure, the target relationship graph is obtained by updating the reference relationship graph based on the first update object group that satisfies the graph update condition, which improves the timeliness of updating the reference relationship graph, and improves the visualization of the display of the association relationship between the objects. The reference object set in the reference relationship graph is updated based on the second update object group, which improves the timeliness of updating the limited scope of the reference object set, and reduces the possibility that the object group in the published object text cannot be completely extracted due to the limited scope of the reference objects.

Figure 5:
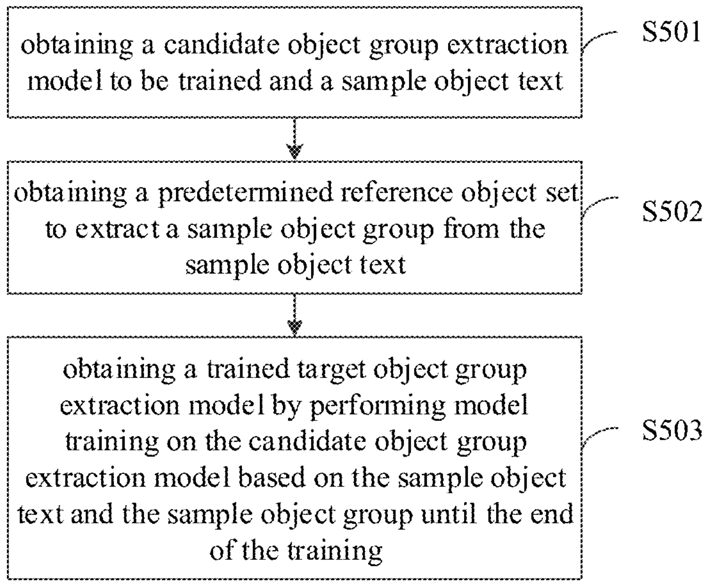
FIG. 5 is a flowchart illustrating a method for training an object group extraction model according to an embodiment of the present disclosure.

A method for training an object group extraction model is also provided in the present disclosure, referring to FIG. 5, which is a flowchart illustrating a method for training an object group extraction model according to an embodiment of the present disclosure. As shown in FIG. 5, the method includes the following steps S501 to S503.

At S501, a candidate object group extraction model to be trained and a sample object text are obtained.

Figure 6:
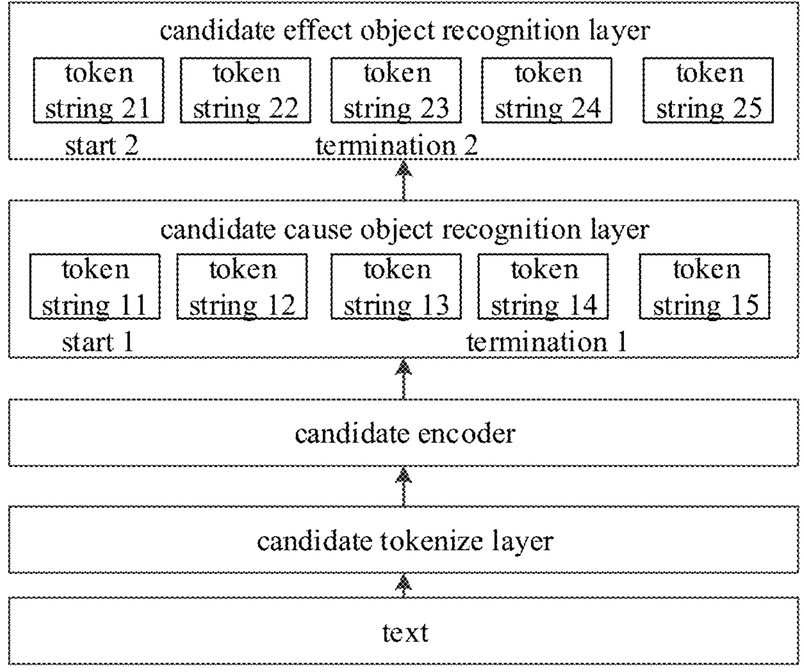
FIG. 6 is a schematic diagram of a candidate object group extraction model according to an embodiment of the present disclosure.

In an embodiment of the present disclosure, an object group extraction model to be trained may be labeled as a candidate object group extraction model. As shown in FIG. 6, the model illustrated in FIG. 6 may be determined as the candidate object group extraction model.

In the scenario, an object text may be obtained from a historically published object text and used as a training sample for the candidate object group extraction model, and is labeled as the sample object text.

At S502, a predetermined reference object set is obtained to extract a sample object group from the sample object text.

In an embodiment of the present disclosure, a reference object set formed by common information objects in the field may be obtained, respective reference objects in the reference object set are used as a benchmark to perform object extraction on the sample object text, and the extracted object are used as a sample object.

Further, an association relationship between the extracted sample objects is obtained, a sample cause object and a sample effect object that have an association relationship among all the sample objects are determined, and a group of the sample cause object and the sample effect object is labeled as a sample object group in the sample object text.

At S503, a trained target object group extraction model is obtained by performing model training on the candidate object group extraction model based on the sample object text and the sample object group until the end of the training.

In an embodiment of the present disclosure, the sample object group may be used as label information of the sample object text, and is input into the candidate object group extraction model for model training, and the trained model is labeled as the target object group extraction model.

The target object group extraction model is used to implement the method for obtaining a graph provided in the embodiments of FIG. 1 to FIG. 4.

Alternatively, a model training end condition may be set based on training rounds. For a current round of model training, when the current training round of the candidate object group extraction model satisfies a predetermined training end condition, the model training of the candidate object group extraction model may be ended, and the model obtained at the end of the last round of training may be determined to be the trained target object group extraction model.

Alternatively, a corresponding model training end condition may be set based on an output result of a training round. For a current round of model training, when the output result of the candidate object group extraction model of the current round satisfies a predetermined training end condition, the model training of the candidate object group extraction model may be ended, and the model obtained at the end of the last round of training may be determined to be the trained target object group extraction model.

The method for training an object group extraction model provided in the present disclosure includes, obtaining a predetermined reference object set to extract a sample object group from the sample object text, and obtaining a trained target object group extraction model by performing model training on the candidate object group extraction model based on the sample object group until the end of the training. In the present disclosure, the model training of the candidate object group extraction model is performed based on the sample object text and the sample object group, which enables the trained target object group extraction model to have the ability to extract the object group from the published object text, and improves the efficiency and accuracy of the extraction of the object group from the published object text.

Figure 7:
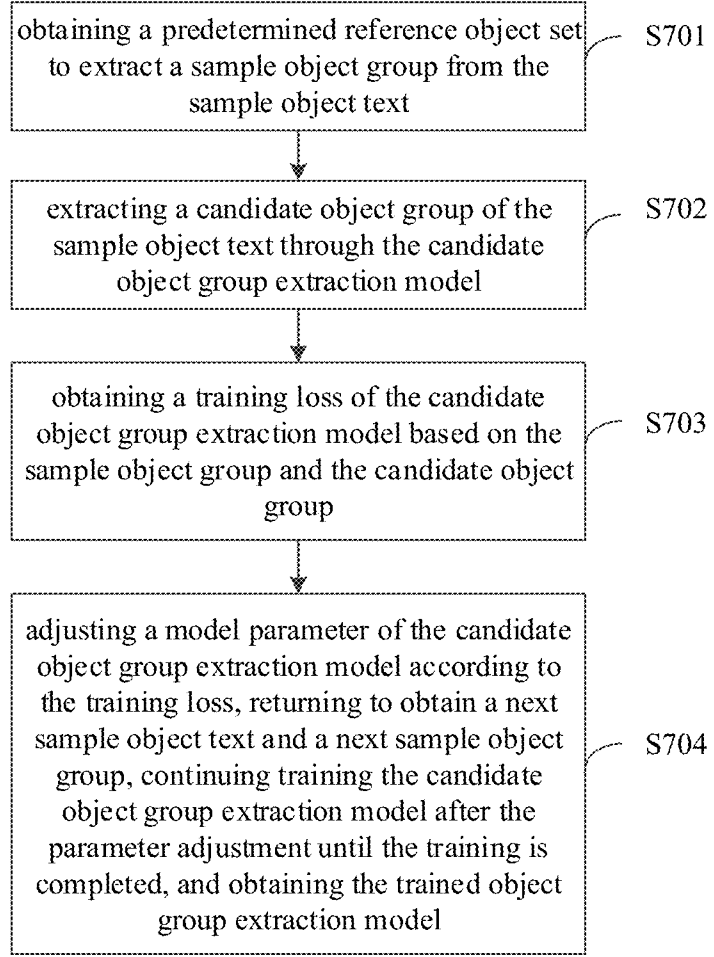
FIG. 7 is a flowchart illustrating a method for training an object group extraction model according to an embodiment of the present disclosure.

The model training of the object group extraction model in the above embodiments may be further understood in conjunction with FIG. 7, which is a flowchart illustrating a method for training an object group extraction model according to an embodiment of the present disclosure. As shown in FIG. 7, the method includes the following steps S701 to S704.

At S701, a predetermined reference object set is obtained to extract a sample object group from the sample object text.

Alternatively, a sample object set in the sample object text is extracted based on the reference object set, and sample object association relationships between respective sample objects in the sample object set are determined based on reference association relationships between respective reference objects in the reference object set; and the sample object group is obtained based on the respective sample objects according to the sample object association relationships.

In an embodiment of the present disclosure, an information object of similar description may be extracted from the sample object text based on the reference object description of respective reference objects in the reference object set, and used as a sample object, so as to obtain a sample object set formed by a plurality of extracted sample objects.

In the scenario, reference association relationships between respective reference objects in the reference object set may be obtained, and an association relationship between respective sample objects in the sample object set may be determined based on the reference association relationships, and is labeled as a sample object association relationship.

Further, a sample cause object and a sample effect object that have the association relationship in the sample object set may be determined based on the association relationship between the sample objects, and the sample cause object and the sample effect object having the association relationship may be combined to form an object group that is labeled as the sample object group.

At S702, a candidate object group of the sample object text is extracted through the candidate object group extraction model.

In an embodiment of the present disclosure, the sample object group may be input into the candidate object group extraction model as label information of the sample object text, the object group may be extracted from the sample object text by the candidate object group extraction model, and the extracted object group may be labeled as the candidate object group.

A candidate tokenize layer, a candidate encoder, a candidate cause object recognition layer, and a candidate effect object recognition layer of the candidate object group extraction model may be obtained.

As an implementation, as shown in FIG. 6, the candidate object group extraction model may include the tokenize layer, the encoder, the cause object recognition layer, and the effect object recognition layer illustrated in FIG. 6. The tokenize layer may be labeled as the candidate tokenize layer, the encoder may be labeled as the candidate encoder, the cause object recognition layer may be labeled as the candidate cause object recognition layer, and the effect object recognition layer may be labeled as the candidate effect object recognition layer.

Alternatively, a sample token string sequence of the sample object text is obtained by performing tokenization on the sample object text input into the model through the candidate tokenize layer; and a sample feature vector of each sample token string is obtained by performing feature extraction on the sample token string in the sample token string sequence through the candidate encoder;

As an implementation, as shown in FIG. 6, the sample object text may be input into the candidate tokenize layer illustrated in FIG. 6, and the sample object text may be tokenized by the candidate tokenize layer, to obtain a token string as the sample token string of the sample object text, and thus obtain the sample token string sequence formed by sample token strings in the sample object text.

Further, as shown in FIG. 6, each sample token string may be input into the candidate encoder illustrated in FIG. 6, and feature extraction is performed on each sample token string by the candidate encoder, and the extracted feature vector is labeled as a sample feature vector of each sample token string.

The candidate encoder may be constructed based on a language representation model (such as, BERT), or may be constructed based on other types of language models, which is not specifically limited herein.

Alternatively, a candidate cause object is extracted based on the sample feature vector of each sample token string through the candidate cause object recognition layer.

In an embodiment of the present disclosure, a candidate cause object start token string and a candidate cause object terminated token string may be recognized based on the sample feature vector of each sample token string through the candidate cause object recognition layer; and a candidate cause object token string in the sample token string sequence is obtained based on the candidate cause object start token string and the candidate cause object terminated token string, to obtain the candidate cause object.

As an implementation, as shown in FIG. 6, a start position and a terminated position of the cause object in the sample object text may be determined by the candidate cause object recognition layer illustrated in FIG. 6, so as to determine an extraction position of the cause object to be extracted in the sample object text.

A start token string of the cause object in the sample object text may be determined as the candidate cause object start token string from the sample token strings, and a terminated token string of the cause object may be determined as the candidate cause object terminated token string from the sample token strings, thus obtaining the candidate cause object token string.

As an implementation shown in FIG. 6, the candidate cause object recognition layer illustrated in FIG. 6 may determine, from sample token strings 11, 12, 13, 14, and 15, the sample token string 11 corresponding to start 1 as a candidate cause object start string, and the sample token string 14 corresponding to termination 1 as a candidate cause object terminated string. Then, the sample token string 11 may be used as the start extraction position, and the sample token string 14 may be used as the terminated extraction position, and thus a token string formed by the sample token string 11, the sample token string 12, the sample token string 13, and the sample token string 14 may be determined to be the candidate cause object string extracted by the candidate cause object recognition layer.

Further, the object formed by the candidate cause object token string is determined to be a candidate cause object.

Alternatively, a candidate effect object is extracted based on the sample feature vector of each sample token string through the candidate effect object recognition layer.

In an embodiment of the present disclosure, a candidate effect object start token string and a candidate effect object terminated token string may be recognized based on the sample feature vector of each sample token string through the candidate effect object recognition layer; and the candidate effect object is obtained by obtaining a candidate effect object token string in the sample token string sequence based on the candidate effect object start token string and the candidate effect object terminated token string.

As an implementation, as shown in FIG. 6, a start position and a terminated position of the effect object in the sample object text may be determined by the candidate effect object recognition layer illustrated in FIG. 6, so as to determine an extraction position of the effect object to be extracted in the sample object text.

A start token string of the effect object in the sample object text may be determined as a candidate effect object start token string from the sample token strings, and a terminated token string of the effect object may be determined as a candidate effect object terminated token string from the sample token strings, thus obtaining the candidate effect object token string.

As an implementation, as shown in FIG. 6, the candidate effect object recognition layer illustrated in FIG. 6 may determine, from sample token strings 21, 22, 23, 24, and 25, the sample token string 21 corresponding to start 2 as a candidate effect object start string, and the sample token string 23 corresponding to termination 2 as a candidate effect object terminated string. Then, the sample token string 21 may be used as the start extraction location, and the sample token string 23 may be used as the terminated extraction location, and thus a token string formed by the sample token string 21, the sample token string 22, and the sample token string 23 may be determined to be the candidate effect object string extracted by the candidate effect object recognition layer.

Further, the object formed by the candidate effect object token string is determined to be a candidate effect object.

Alternatively, a candidate object group output by the candidate object group extraction model is obtained based on the candidate cause object and the candidate effect object.

In an embodiment of the present disclosure, after the candidate cause object is extracted by the candidate effect object recognition layer and the candidate effect object that has a association relationship with the candidate cause object is extracted by the candidate effect object recognition layer, the extracted candidate cause object and the extracted candidate effect object may be grouped to obtain an object group, and the object group may be determined as a candidate object group extracted by the candidate object group extraction model.

At S703, a training loss of the candidate object group extraction model is obtained based on the sample object group and the candidate object group.

Alternatively, the sample object group and the candidate object group may be processed based on a loss value acquisition algorithm in the related art, and then a corresponding loss value may be obtained based on the algorithm processing result and is used as the training loss of the candidate object group extraction model.

At S704, a model parameter of the candidate object group extraction model is adjusted according to the training loss, returning to obtain a next sample object text and a next sample object group, training the candidate object group extraction model after the parameter adjustment is continued until the training is completed, and the trained object group extraction model is obtained.

In an embodiment of the present disclosure, the model parameter in the candidate object group extraction model may be adjusted and optimized based on the training loss, thus obtaining the adjusted candidate object group extraction model.

In the scenario, a trained target object group extraction model may be obtained by returning to obtain the next sample object text and the next sample object group in the next sample object text and continuing the model training of the candidate object group extraction model after the parameter adjustment until the training is completed.

The detailed information about the candidate object group extraction model satisfying the end condition of model training can be found in the above embodiments, which is not repeated here.

According to the method for training an object group extraction model provided in the present disclosure, the extraction location of the candidate cause object is determined through the candidate cause object recognition layer, and the extraction location of the candidate effect object is determined through the candidate effect object recognition layer, and then the model training is performed on the candidate object group extraction model based on the sample object text and the sample object group, enabling the trained target object group extraction model to have the ability to extract the object group from the published object text. This improves the extraction efficiency and accuracy of the object group from the published object text in the scenario where the object group extraction is performed based on the target object group extraction model.

According to an embodiment of the present disclosure, there is provided an apparatus for obtaining a graph, which corresponds to the method for obtaining a graph provided in the above embodiments. Since the apparatus for obtaining a graph provided in the embodiment of the present disclosure corresponds to the method for obtaining a graph provided in the above embodiments, the implementation of the method for obtaining a graph described above is applicable to the apparatus for obtaining a graph provided in the embodiment of the present disclosure, which will not be described in detail in the following embodiments.

Figure 8:
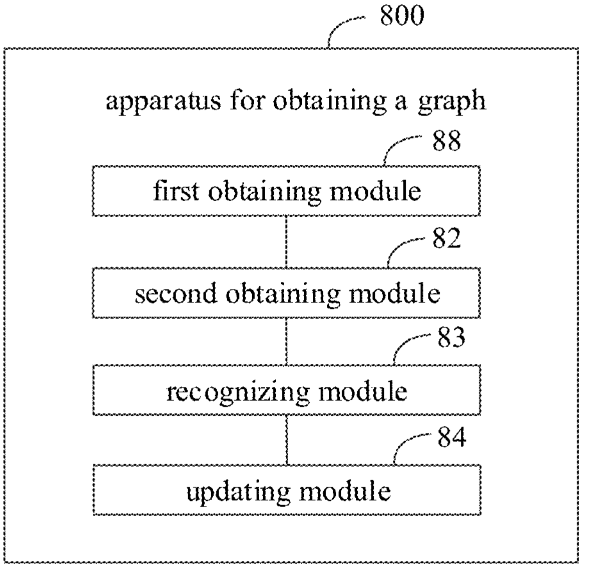
FIG. 8 is a block diagram illustrating an apparatus for obtaining a graph according to an embodiment of the present disclosure.

FIG. 8 is a diagram illustrating an architecture of an apparatus for obtaining a graph according to an embodiment of the present disclosure. As shown in FIG. 8, the apparatus 800 for obtaining a graph includes a first obtaining module 81, a second obtaining module 82, a recognizing module 83, and an updating module 84.

The first obtaining module 81 is configure to obtain a predetermined reference relationship graph.

The second obtaining module 82 is configure to obtain an update object text and extract a first update object group in the update object text.

The recognizing module 83 is configure to recognize whether the first update object group satisfies a graph update condition of the reference relationship graph.

The updating module 84 is configure to obtain an updated target relationship graph by updating the reference relationship graph based on the first update object group in response to recognizing the first update object group satisfies the graph update condition.

In an embodiment of the present disclosure, the second obtaining module 82 is further configure to: extract an update token string sequence of the update object text and obtain an update feature vector of each update token string in the update token string sequence; extract an update cause object based on the update feature vector of each update token string; extract an update effect object based on the update feature vector of each update token string; and obtain the first update object group of the update object text based on the update cause object and the update effect object.

In an embodiment of the present disclosure, the second obtaining module 82 is further configure to: recognize an update cause object start token string and an update cause object terminated token string based on the update feature vector of each update token string; and obtain the update cause object, by obtaining an update cause object token string in the update token string sequence based on the update cause object start token string and the update cause object terminated token string.

In an embodiment of the present disclosure, the second obtaining module 82 is further configure to: recognize an update effect object start token string and an update effect object terminated token string based on the update feature vector of each update token string; and obtain the update effect object, by obtaining an update effect object token string in the update token string sequence based on the update effect object start token string and the update effect object terminated token string.

In an embodiment of the present disclosure, the recognizing module 83, is further configure to: obtain reference association relationships between respective reference objects from the reference relationship graph; obtain an update association relationship of the first update object group; obtain, for any of the reference association relationships, a relationship similarity between the reference association relationship and the update association relationship; and recognize whether the first update object group satisfies the graph update condition based on the relationship similarity.

In an embodiment of the present disclosure, the recognizing module 83, is further configure to: determine and recognize, in response to the relationship similarity between any reference association relationship and the update association relationship being greater than or equal to a predetermined relationship similarity threshold, that the first update object group satisfies the graph update condition; determine and recognize, in response to the relationship similarity between any reference association relationship in the reference relationship graph and the update association relationship being less than the predetermined relationship similarity threshold, that the first update object group does not satisfy the graph update condition.

In an embodiment of the present disclosure, the updating module 84, is further configure to: obtain, in response to recognizing that the first update object group satisfies the graph update condition, an associated object group for the first update object group in the reference relationship graph; obtain an associated object relationship of the associated object group; and obtain the target relationship graph by updating the reference relationship graph through merging the first update object group into the associated object group based on the update association relationship and the associated object relationship.

In an embodiment of the present disclosure, the first obtaining module 81 is further configure to: obtain a predetermined reference object set, and a reference object description of each reference object; obtain reference association relationships between respective reference objects; input the reference object description of each reference object and the reference association relationships between respective reference objects into a graph database Bgraph, and obtain the reference relationship graph of the reference object set through a graph construction capability of the graph database BGraph.

In an embodiment of the present disclosure, the updating module 84, is further configure to: obtain an object class cluster of a second update object group set, by adding the first update object group to the second update object group set and clustering the second update object group set in response to recognizing that the first update object group does not satisfy the graph update condition; obtain an object label of the object class cluster; and add, in response to the object label satisfying a predetermined addition condition of a reference object set, the object label as a new reference object to the reference object set.

In an embodiment of the present disclosure, the updating module 84, is further configure to: obtain a new reference relationship graph by performing a node update of the reference relationship graph based on the new reference object.

The apparatus for obtaining a graph is configure to obtain a predetermined reference relationship graph; obtain an update object text and extract a first update object group from the update object text; recognize whether the first update object group satisfies a graph update condition of the reference relationship graph; obtain an updated target relationship graph by updating the reference relationship graph based on the first update object group in response to recognizing the first update object group satisfies the graph update condition. In the present disclosure, the first update object group of the update object text is extracted and the updated target relationship graph is obtained by updating the reference relationship graph based on the first update object group in response to recognizing the first update object group satisfies the graph update condition, which improves the timeliness of updating the reference relationship graph and reduces the possibility that the object group in the published object text cannot be completely extracted due to the limitation of the scope of the reference objects corresponding to the reference relationship graph. The method improves the visualization of the display of the association relationship by performing the display of the association relationship through the target relationship graph, reduces the complexity of obtaining the association relationship and improves the efficiency and accuracy of obtaining the association relationship in the scenario that the association relationship is one cause-multiple effects and/or multiple causes-one effect relationship in the causal relationship. In the scenario that the extracted object group is analyzed based on the association relationship, the method improves the efficiency and accuracy of the analysis of the object group, reduces the complexity of the pre-analysis narrative preparation, improves the efficiency of the information obtaining, and thus improves the accuracy and timeliness of the execution of the relevant downstream tasks.

According to an embodiment of the present disclosure, there is provided an apparatus for training an object group extraction model, which corresponds to the method for training an object group extraction model in the above embodiments. Since the apparatus for training an object group extraction model provided in the embodiment of the present disclosure corresponds to the method for training an object group extraction model provided in the above embodiments, the implementation of the method for training an object group extraction model described above is applicable to the apparatus for training an object group extraction model provided in the embodiment of the present disclosure, which will not be described in detail in the following embodiments.

Figure 9:
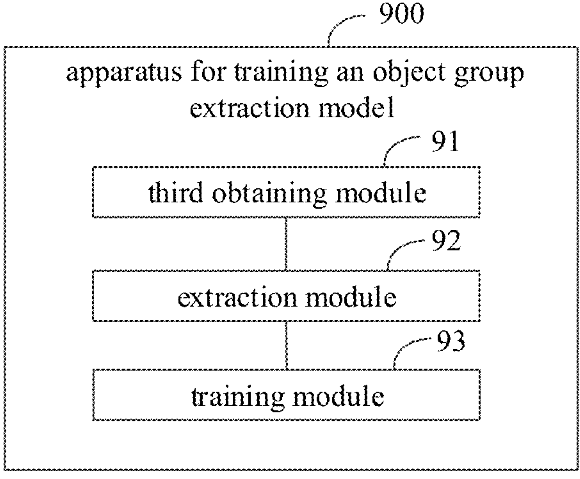
FIG. 9 is a block diagram illustrating an apparatus for training an object group extraction model according to an embodiment of the present disclosure.

FIG. 9 is a diagram illustrating an architecture of an apparatus for training an object group extraction model according to an embodiment of the present disclosure, as shown in FIG. 9, the apparatus 900 for training an object group extraction model, includes a third obtaining module 91, an extraction module 92, and a training module 93.

The third obtaining module 91 is configure to obtain a candidate object group extraction model to be trained and a sample object text.

The extraction module 92 is configure to obtain a predetermined reference object set to extract a sample object group from the sample object text.

The training module 93 is configure to obtain a trained target object group extraction model by performing model training on the candidate object group extraction model based on the sample object text and the sample object group until the end of the training, in which the target object group extraction model is configure to implement the method for obtaining a graph according to FIG. 9.

In an embodiment of the present disclosure, the extraction module 92 is further configure to: extract a sample object set in the sample object text based on the reference object set, and determine sample object association relationships between respective sample objects in the sample object set based on reference association relationships between respective reference objects in the reference object set; and obtain the sample object group based on the respective sample objects according to the sample object association relationships.

In an embodiment of the present disclosure, the training module 93 is further configure to: extract a candidate object group of the sample object text through the candidate object group extraction model; obtain a training loss of the candidate object group extraction model based on the sample object group and the candidate object group; and adjust a model parameter of the candidate object group extraction model according to the training loss, return to obtain a next sample object text and a next sample object group, continue training the candidate object group extraction model after the parameter adjustment until the training is completed, and obtain the trained object group extraction model.

In an embodiment of the present disclosure, the training module 93 is further configure to: obtain a candidate tokenize layer, a candidate encoder, a candidate cause object recognition layer, and a candidate effect object recognition layer of the candidate object group extraction model; obtain a sample token string sequence of the sample object text by performing tokenization on the sample object text through the candidate tokenize layer; obtain a sample feature vector of each sample token string by performing feature extraction on the sample token string in the sample token string sequence through the candidate encoder; extract a candidate cause object based on the sample feature vector of the sample token string through the candidate cause object recognition layer; extract a candidate effect object based on the sample feature vector of the sample token string through the candidate effect object recognition layer; and obtain a candidate object group output by the candidate object group extraction model based on the candidate cause object and the candidate effect object.

In an embodiment of the present disclosure, the training module 93 is further configure to: recognize a candidate cause object start token string and a candidate cause object terminated token string based on the sample feature vector of the sample token string through the candidate cause object recognition layer; and obtain the candidate cause object by obtaining a candidate cause object token string in the sample token string sequence based on the candidate cause object start token string and the candidate cause object terminated token string.

In an embodiment of the present disclosure, the training module 93 is further configure to: recognize a candidate effect object start token string and a candidate effect object terminated token string based on the sample feature vector of the sample token string through the candidate effect object recognition layer; and obtain the candidate effect object by obtaining a candidate effect object token string in the sample token string sequence based on the candidate effect object start token string and the candidate effect object terminated token string.

The apparatus for training an object group extraction model provided in the present disclosure is configure to obtain a sample object text and extract a sample object group from the sample object text, and obtain a trained target object group extraction model by performing model training on the candidate object group extraction model based on the sample object group until the end of the training. In the present disclosure, model training of the candidate object group extraction model is performed based on the sample object text and the sample object group, which enables the trained target object group extraction model to have the ability to extract the object group from the published object text, and improves the efficiency and accuracy of the extraction of the object group from the published object text.

According to embodiments of the present disclosure, there are also provided an electronic device, a readable storage medium, and a computer program product.

Figure 10:
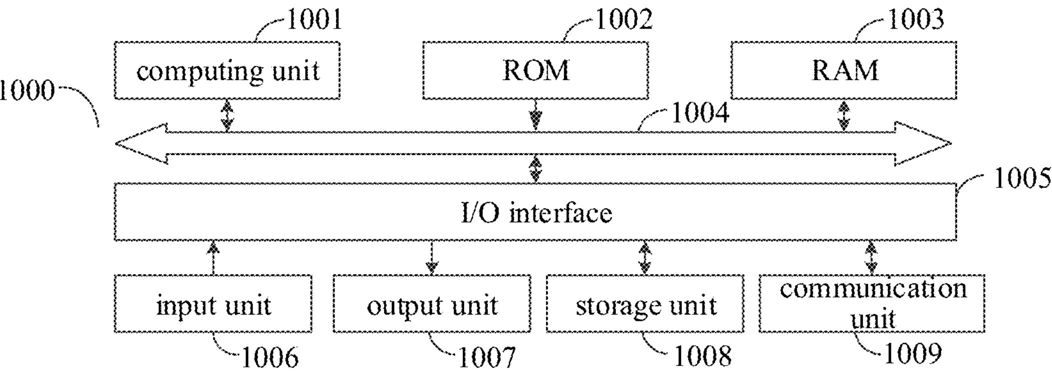
FIG. 10 is a block diagram illustrating an electronic device according to an embodiment of the present disclosure.

Referring to FIG. 10, which is a block diagram illustrating an electronic device 1000 according to an embodiment of the present disclosure. The electronic device is intended to represent various types of digital computers, such as laptop computers, desktop computers, workstations, personal digital assistants, servers, blade servers, mainframe computers, and other suitable computers. The electronic device may also represent various types of mobile apparatuses, such as personal digital assistants, cellular phones, smart phones, wearable non-intrusive flexible loads aggregation characteristic identification devices, and other similar computing devices. The components shown herein, their connections and relations, and their functions are merely examples, and are not intended to limit the implementation of the disclosure described and/or required herein.

As shown in FIG. 10, the device 1000 includes a computing unit 1001, configured to execute various appropriate actions and processes according to a computer program stored in a read-only memory (ROM) 1002 or loaded from a storage unit 1008 to a random access memory (RAM) 1003. In the RAM 1003, various programs and data required for the device 1000 may be stored. The computing unit 1001, the ROM 1002 and the RAM 1003 may be connected with each other by a bus 1004. An input/output (I/O) interface 1005 is also connected to the bus 1004.

The device 1000 are connected to an I/O interface 1005, and includes: an input unit 1006, for example, a keyboard, a mouse; an output unit 1007, for example, various types of displays, speakers; a storage unit 1008, for example, a magnetic disk, an optical disk; and a communication unit 1009, for example, a network card, a modem, a wireless transceiver. The communication unit 1009 allows the device 1000 to exchange information/data through a computer network such as internet and/or various types of telecommunication networks and other devices.

The computing unit 1001 may be various types of general and/or dedicated processing components with processing and computing ability. Some examples of a computing unit 1001 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 1001 executes various methods and processes as described above, for example, a method for obtaining a graph and/or a method for training an object group extraction model. For example, in some embodiments, the method for obtaining a graph and/or the method for training an object group extraction model may be further implemented as a computer software program, which is physically contained in a machine readable medium, such as the storage unit 1008. In some embodiments, a part or all of the computer program may be loaded and/or installed on the device 1000 via the ROM 1002 and/or a communication unit 1009. When the computer program is loaded on the RAM 1003 and executed by the computing unit 1001, one or more steps in the method for obtaining a graph and/or the method for training an object group extraction model as described above may be performed. Alternatively, in other embodiments, the computing unit 1001 may be configured to perform the method for obtaining a graph and/or the method for training an object group extraction model in other appropriate ways (for example, by virtue of a firmware).

Various implementation modes of systems and technologies described herein may be implemented in a digital electronic circuit system, an integrated circuit system, a field programmable gate array (FPGA), a dedicated application specific integrated circuit (ASIC), a system on a chip (SOC), a complex programmable logic device (CPLD), a computer hardware, a firmware, a software, and/or combinations thereof. The implementations may include being implemented in one or more computer programs. The one or more computer programs may be executed and/or interpreted on a programmable system including at least one programmable processor. The programmable processor may be a dedicated or general-purpose programmable processor, may receive data and instructions from a storage system, at least one input device, and at least one output device, and transmit the data and the instructions to the storage system, the at least one input device, and the at least one output device.

A computer code configured to execute a method in the present disclosure may be written with one or any combination of multiple programming languages. These programming languages may be provided to a processor or a controller of a general-purpose computer, a dedicated computer, or other programmable apparatuses for data processing so that the function/operation specified in the flowchart and/or block diagram may be performed when the program code is executed by the processor or controller. A computer code may be executed completely or partly on the machine, executed partly on the machine as an independent software package and executed partly or completely on the remote machine or server.

In the context of the present disclosure, a machine-readable medium may be a tangible medium that may contain or store a program intended for use in or in conjunction with an instruction execution system, an apparatus or a device. The machine-readable medium may be a machine-readable signal medium or a machine-readable storage medium. The machine-readable medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an erasable programmable read-only ROM (EPROM or a flash memory), an optical fiber device, and a compact disc read-only memory (CD-ROM), an optical storage device, a magnetic storage device, or any appropriate combination of the above.

In order to provide interaction with the user, the systems and technologies described here may be implemented on a computer, and the computer includes: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user. For example, the feedback provided to the user may be any form of sensory feedback (for example, visual feedback, auditory feedback, or tactile feedback); and input from the user may be received in any form (including an acoustic input, a voice input or a tactile input).

Systems and technologies described herein may be implemented in a computing system (for example, as a data server) including a background component, or a computing system (for example, an application server) including a middleware component, or a computing system including a front-end component (for example, a user computer with a graphical user interface or a web browser, and the user may interact with implementations of the systems and technologies described herein via the graphical user interface or the web browser), or in a computing system including any combination of the background component, the middleware component, or the front-end component. Components of the system may be interconnected by any form or medium of digital data communication (for example, a communication network). Examples of the communication network include a local area network (LAN), a wide area network (WAN), and an Internet.

The computer system may include a client and a server. The client and the server are generally far away from each other and generally interact with each other through a communication network. The relationship between the client and the server is generated by computer programs that run on the corresponding computer and have a client-server relationship with each other. The server may be a cloud server, or a server with a distributed system, or a server in combination with a blockchain.

It should be noted that various forms of processes shown above may be used to reorder, add, or delete steps. For example, steps described in the present disclosure may be executed in parallel, sequentially, or in a different order, as long as the desired result of the technical solution disclosed in the present disclosure may be achieved, which will not be limited herein.

The above implementations do not constitute a limitation of the protection scope of the disclosure. Those skilled in the art shall understand that various modifications, combinations and sub-combinations and substitutions may be made. Any modification, equivalent substitution and improvement, etc., made within the spirit and principle of the present disclosure shall be included within the protection scope of the present disclosure.

What is claimed is:

1. A method for training an object group extraction model, comprising:

obtaining a candidate object group extraction model to be trained and a sample object text;

obtaining a predetermined reference object set to extract a sample object group from the sample object text;

obtaining a trained target object group extraction model by performing model training on the candidate object group extraction model based on the sample object text and the sample object group until the end of the training, wherein the target object group extraction model is configured to:

obtain a predetermined reference relationship graph;

obtain an update object text and extract a first update object group in the update object text;

recognize whether the first update object group satisfies a graph update condition of the reference relationship graph; and obtain an updated target relationship graph by updating the reference relationship graph based on the first update object group in response to recognizing the first update object group satisfies the graph update condition.

2. The method according to claim 1, wherein obtaining the predetermined reference object set to extract the sample object group from the sample object text, comprises:

extracting a sample object set in the sample object text based on the reference object set, and determining sample object association relationships between respective sample objects in the sample object set based on reference association relationships between respective reference objects in the reference object set; and obtaining the sample object group based on the respective sample objects according to the sample object association relationships.

3. The method according to claim 1, wherein obtaining the trained target object group extraction model by performing model training on the candidate object group extraction model based on the sample object text and the sample object group until the end of the training, comprises:

extracting a candidate object group of the sample object text through the candidate object group extraction model;

obtaining a training loss of the candidate object group extraction model based on the sample object group and the candidate object group; and adjusting a model parameter of the candidate object group extraction model according to the training loss, returning to obtain a next sample object text and a next sample object group, continuing training the candidate object group extraction model after the parameter adjustment until the training is completed, and obtaining the trained object group extraction model.

4. The method according to claim 3, wherein extracting the candidate object group of the sample object text through the candidate object group extraction model, comprises:

obtaining a candidate tokenize layer, a candidate encoder, a candidate cause object recognition layer, and a candidate effect object recognition layer of the candidate object group extraction model;

obtaining a sample token string sequence of the sample object text by performing tokenization on the sample object text through the candidate tokenize layer;

obtaining a sample feature vector of each sample token string by performing feature extraction on the sample token string in the sample token string sequence through the candidate encoder;

extracting a candidate cause object based on the sample feature vector of the sample token string through the candidate cause object recognition layer;

extracting a candidate effect object based on the sample feature vector of the sample token string through the candidate effect object recognition layer; and obtaining a candidate object group output by the candidate object group extraction model based on the candidate cause object and the candidate effect object.

5. The method according to claim 4, wherein extracting the candidate cause object based on the sample feature vector of the sample token string through the candidate cause object recognition layer, comprises:

recognizing a candidate cause object start token string and a candidate cause object terminated token string based on the sample feature vector of the sample token string through the candidate cause object recognition layer; and obtaining the candidate cause object by obtaining a candidate cause object token string in the sample token string sequence based on the candidate cause object start token string and the candidate cause object terminated token string.

6. The method according to claim 4, wherein extracting the candidate effect object based on the sample feature vector of the sample token string through the candidate effect object recognition layer, comprises:

recognizing a candidate effect object start token string and a candidate effect object terminated token string based on the sample feature vector of the sample token string through the candidate effect object recognition layer; and obtaining the candidate effect object by obtaining a candidate effect object token string in the sample token string sequence based on the candidate effect object start token string and the candidate effect object terminated token string.

7. A device for training an object group extraction model, comprising:

at least one processor; and a memory communicatively coupled to the at least one processor and storing instructions executable by the at least one processor, wherein the at least one processor is configured to:

obtain a candidate object group extraction model to be trained and a sample object text;

obtain a predetermined reference object set to extract a sample object group from the sample object text;

obtain a trained target object group extraction model by performing model training on the candidate object group extraction model based on the sample object text and the sample object group until the end of the training, wherein the target object group extraction model is configured to:

obtain a predetermined reference relationship graph;

obtain an update object text and extract a first update object group in the update object text;

recognize whether the first update object group satisfies a graph update condition of the reference relationship graph; and obtain an updated target relationship graph by updating the reference relationship graph based on the first update object group in response to recognizing the first update object group satisfies the graph update condition.

8. The device according to claim 7, wherein the processor, in obtaining the predetermined reference object set to extract the sample object group from the sample object text, is further configured to:

extract a sample object set in the sample object text based on the reference object set, and determine sample object association relationships between respective sample objects in the sample object set based on reference association relationships between respective reference objects in the reference object set; and obtain the sample object group based on the respective sample objects according to the sample object association relationships.

9. The device according to claim 7, wherein the processor, in obtaining the trained target object group extraction model by performing model training on the candidate object group extraction model based on the sample object text and the sample object group until the end of the training, is further configured to:

extract a candidate object group of the sample object text through the candidate object group extraction model;

obtain a training loss of the candidate object group extraction model based on the sample object group and the candidate object group; and adjust a model parameter of the candidate object group extraction model according to the training loss, return to obtain a next sample object text and a next sample object group, continue training the candidate object group extraction model after the parameter adjustment until the training is completed, and obtain the trained object group extraction model.

10. The device according to claim 9, wherein the processor, in extracting the candidate object group of the sample object text through the candidate object group extraction model, is further configured to:

obtain a candidate tokenize layer, a candidate encoder, a candidate cause object recognition layer, and a candidate effect object recognition layer of the candidate object group extraction model;

obtain a sample token string sequence of the sample object text by performing tokenization on the sample object text through the candidate tokenize layer;

obtain a sample feature vector of each sample token string by performing feature extraction on the sample token string in the sample token string sequence through the candidate encoder;

extract a candidate cause object based on the sample feature vector of the sample token string through the candidate cause object recognition layer;

extract a candidate effect object based on the sample feature vector of the sample token string through the candidate effect object recognition layer; and obtain a candidate object group output by the candidate object group extraction model based on the candidate cause object and the candidate effect object.

11. The device according to claim 10, wherein the processor, in extracting the candidate cause object based on the sample feature vector of the sample token string through the candidate cause object recognition layer, is further configured to:

recognize a candidate cause object start token string and a candidate cause object terminated token string based on the sample feature vector of the sample token string through the candidate cause object recognition layer; and obtain the candidate cause object by obtaining a candidate cause object token string in the sample token string sequence based on the candidate cause object start token string and the candidate cause object terminated token string.

12. The device according to claim 10, wherein the processor, in extracting the candidate effect object based on the sample feature vector of the sample token string through the candidate effect object recognition layer, is further configured to:

recognize a candidate effect object start token string and a candidate effect object terminated token string based on the sample feature vector of the sample token string through the candidate effect object recognition layer; and obtain the candidate effect object by obtaining a candidate effect object token string in the sample token string sequence based on the candidate effect object start token string and the candidate effect object terminated token string.

13. A non-transitory computer-readable storage medium, storing computer instructions, wherein the computer instructions are configured to cause a computer to perform a method for training an object group extraction model, the method comprising:

obtaining a candidate object group extraction model to be trained and a sample object text;

obtaining a predetermined reference object set to extract a sample object group from the sample object text;

obtaining a trained target object group extraction model by performing model training on the candidate object group extraction model based on the sample object text and the sample object group until the end of the training, wherein the target object group extraction model is configured to:

obtain a predetermined reference relationship graph;

obtain an update object text and extract a first update object group in the update object text;

recognize whether the first update object group satisfies a graph update condition of the reference relationship graph; and obtain an updated target relationship graph by updating the reference relationship graph based on the first update object group in response to recognizing the first update object group satisfies the graph update condition.

14. The storage medium according to claim 13, wherein obtaining the predetermined reference object set to extract the sample object group from the sample object text, comprises:

extracting a sample object set in the sample object text based on the reference object set, and determining sample object association relationships between respective sample objects in the sample object set based on reference association relationships between respective reference objects in the reference object set; and obtaining the sample object group based on the respective sample objects according to the sample object association relationships.

15. The storage medium according to claim 13, wherein obtaining the trained target object group extraction model by performing model training on the candidate object group extraction model based on the sample object text and the sample object group until the end of the training, comprises:

extracting a candidate object group of the sample object text through the candidate object group extraction model;

obtaining a training loss of the candidate object group extraction model based on the sample object group and the candidate object group; and adjusting a model parameter of the candidate object group extraction model according to the training loss, returning to obtain a next sample object text and a next sample object group, continuing training the candidate object group extraction model after the parameter adjustment until the training is completed, and obtaining the trained object group extraction model.

16. The storage medium according to claim 15, wherein extracting the candidate object group of the sample object text through the candidate object group extraction model, comprises:

obtaining a candidate tokenize layer, a candidate encoder, a candidate cause object recognition layer, and a candidate effect object recognition layer of the candidate object group extraction model;

obtaining a sample token string sequence of the sample object text by performing tokenization on the sample object text through the candidate tokenize layer;

obtaining a sample feature vector of each sample token string by performing feature extraction on the sample token string in the sample token string sequence through the candidate encoder;

extracting a candidate cause object based on the sample feature vector of the sample token string through the candidate cause object recognition layer;

extracting a candidate effect object based on the sample feature vector of the sample token string through the candidate effect object recognition layer; and obtaining a candidate object group output by the candidate object group extraction model based on the candidate cause object and the candidate effect object.

17. The storage medium according to claim 16, wherein extracting the candidate cause object based on the sample feature vector of the sample token string through the candidate cause object recognition layer, comprises:

recognizing a candidate cause object start token string and a candidate cause object terminated token string based on the sample feature vector of the sample token string through the candidate cause object recognition layer; and obtaining the candidate cause object by obtaining a candidate cause object token string in the sample token string sequence based on the candidate cause object start token string and the candidate cause object terminated token string.

18. The storage medium according to claim 16, wherein extracting the candidate effect object based on the sample feature vector of the sample token string through the candidate effect object recognition layer, comprises:

recognizing a candidate effect object start token string and a candidate effect object terminated token string based on the sample feature vector of the sample token string through the candidate effect object recognition layer; and obtaining the candidate effect object by obtaining a candidate effect object token string in the sample token string sequence based on the candidate effect object start token string and the candidate effect object terminated token string.

* * * * *